May 12, 1964

H. LINDEMANN 3,132,564

METHOD FOR THE PEELING OF ELONGATED WORK
PIECES TENDING TO BUCKLING

Filed Jan. 16, 1963

INVENTOR.
HANS LINDEMANN

BY Dicke & Craig
ATTORNEYS.

United States Patent Office 3,132,564
Patented May 12, 1964

3,132,564
METHOD FOR THE PEELING OF ELONGATED WORK PIECES TENDING TO BUCKLING
Hans Lindemann, Grossdornberg, near Bielefeld, Germany, assignor to Th. Calow & Co., Bielefeld, Germany
Filed Jan. 16, 1963, Ser. No. 251,892
Claims priority, application Germany Jan. 18, 1962
1 Claim. (Cl. 90—24)

The invention relates to a method for the peeling of elongated work pieces liable to buckling, such as tubes, bars or the like, of commercial lengths. The machining of such work pieces consisting of steel or of high grade alloys by peeling has the disadvantage that the material to be peeled has either firstly to be pointed or to be pushed into a peeling die. The pointing requires comparatively much time, since with chip removing pointing machines it is usual to operate with a feed of half a metre per minute since otherwise the machine would become disproportionally expensive. On the other hand the pushing of the material to be peeled through a die is comparatively difficult, since the material to be machined has to be secured against buckling. For these reasons the die-peeling process has not yet found acceptance in practice for the machining of steel and high grade alloys, although the output of a die-peeling machine is a multiple of the output of a peeling machine having a rotary cutter head; for the feed of the material to be machined by die-peeling then corresponds to the speed of cutting of the rotary tools of the peeling machines at present used in practice.

With a device for the descaling of a wire having two or more rollers, between which the wire runs and whose axes preferably stand at right angles to one another, for breaking the scale, it is known to arrange scrapers after the rollers which when drawing in the wire are movable in unison towards the wire or away from it. Accordingly the end of the wire to be machined, which is coiled upon a reel, is firstly passed around the rollers and pushed through the scrapers, which leave a sufficient cross sectional area free, and is then attached to a coiling up reel. Then the scrapers are moved towards the wire, and the latter is pulled through between the scrapers. The end of the wire, which had not been machined, is not used, and is accordingly severed off the coiling up reel after the uncoiling of the machined wire. In a similar way strips are being machined on their broad faces, particularly strips of comparatively low thickness. With machines for the machining of blocks it is likewise known to provide cutters which are adjustable towards the work piece and away from it, which cutters continuously vary their operative working diameter in the case of conical work pieces.

The invention has the object of machining elongated work pieces of commercial length over the total length, without having to point them or to push the work piece or work pieces through, the movement of the work piece to be effected exclusively by pulling the work piece.

For the solution of this problem, it is proposed according to the invention to effect the peeling starting from a point on the work piece intermediate its ends, in two oppositely directed peeling operations of the conventional kind, the thickness of the chip increasing at the beginning of the first peeling operation. Accordingly one end of the untreated work piece is attached to a pull member, and during the movement of the work piece through the peeling tool or tools the cutting edges of the tool are advanced in accordance of the desired profile of the work piece. Firstly one part of the work piece is being peeled, and then the machined part is clamped fast and the rest of the work piece is machined by pulling the work piece after resetting the same once or repeatedly. Whether this machining is carried out on one and the same peeling machine or on two separate peeling machines, is irrelevant; one may even coordinate with one peeling machine two peeling dies and two pull members which allow die-peeling in both directions, i.e. firstly one peeling die and one pull member is used for the machining, and when one part of the work piece is finished, the direction of movement of the work piece is reversed. i.e. the work piece is pulled by the other pulling member and is finished by the other peeling die.

What profile the material to be treated has, is irrelevant in itself. It is accordingly possible to machine bars of rectangular profile in this manner by die-peeling. It is only necessary to take care that the peeling die is composed as usual of several parts, which are preferably movable in a radial direction in such a manner, that for inserting the untreated end of the material to be peeled the required cross sectional area is available. Obviously these parts, when adjusted to the actually desired profile, must contact one another in the usual manner; however, the individual cutting faces need not lie all in the same plane, as is likewise known for peeling dies. Accordingly, for example with billets of rectangular profile, one may machine firstly one pair of opposite faces, and subsequently the other pair of opposite faces by die-peeling. Obviously, as known in itself, one may subdivide the chip when it becomes comparatively wide or when the chip rolls off badly.

Figure 1:
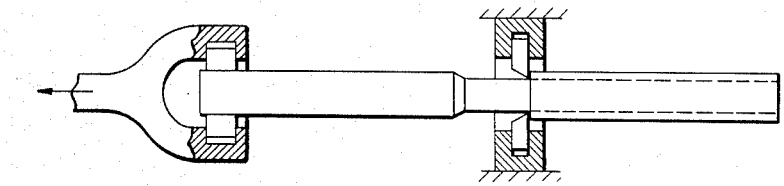
FIGURE 1 is a schematic view, partially in cross section, indicating how the initial step of the method in accordance with the present invention of peeling or scalping the work piece is realized.

FIGURE 1 illustrates purely schematically the work piece such as a rod or the like, clamped at the left end thereof into a pulling installation; the work piece illustrated in this figure has been machined already in the center region thereof by knives adjustable in the radial direction. However, the right hand end of the work piece has not yet been machined. Indicated in dash line in this figure is the diameter of the work piece after the right hand end thereof is completely machined, that is, has received its desired diameter by peeling or scalping.

Figure 2:
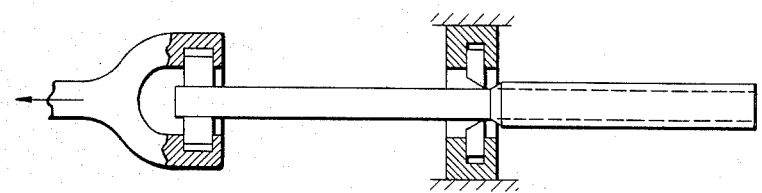
FIGURE 2 is a schematic view, partially in cross section, indicating how the succeeding step of the method in accordance with the present invention is realized.

After one end of the work piece has thus been machined by peeling or scalping, the already peeled or scalped end of the work piece is, as shown in FIGURE 2, thereupon clamped into the pulling installation and thereafter the end of the work piece not yet machined up to that time is now also being machined.

Figure 3:
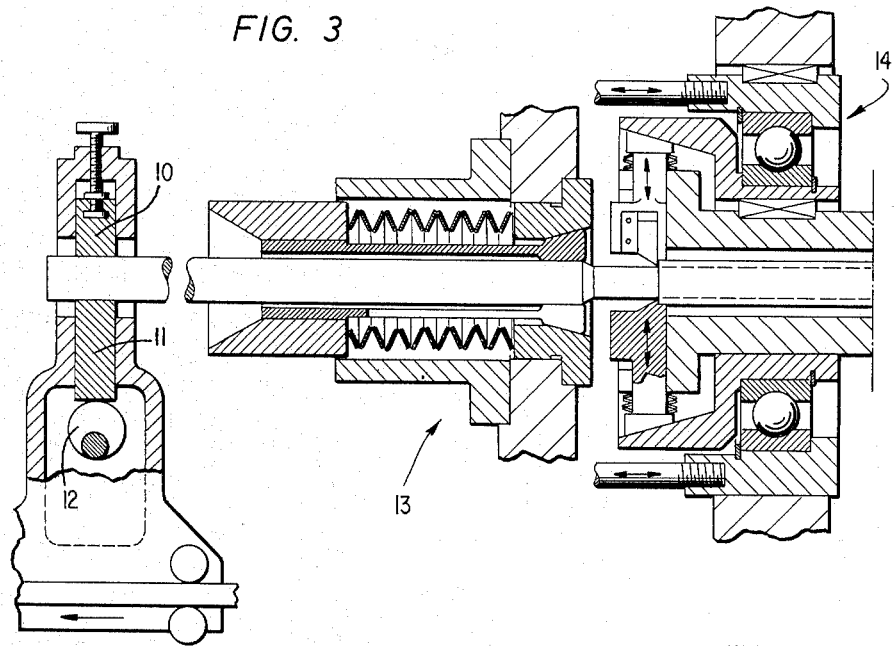
FIGURE 3 is a partial cross sectional view of an apparatus in accordance with the present invention.

While any suitable machine and apparatus of conventional construction may be utilized in accordance with the present invention, FIGURE 3 illustrates one such prior art construction that could be used for purposes of the present invention. Any known conventional clamping carriage may be utilized as pulling installation and, in the illustrated embodiment, comprises two clamping jaws. The upper clamping jaw 10 is thereby manually adjustable whereas the lower clamping jaw 11 is adapted to be raised and lowered by means of an eccentric 12. Adjoining toward the right follows a guide means generally designated by reference numeral 13 which may be constructed substantially as shown and described in my copending prior application Serial No. 64,590, filed in the U.S. Patent Office on October 24, 1960, now Patent 3,099,929, issued August 6, 1963.

The peeling or scalping head structure generally designated by reference numeral 14 follows the guide means toward the right as viewed in FIGURE 3. This scalping or peeling head structure may again be substantially as shown and described in my aforementioned copending application. While the head structure of this copending application is rotatable, it is, of course, obvious that this is not necessary in connection with the present invention so that the means enabling rotation of the scalping or peeling head structure of my aforementioned copending application may be omitted in connection with the apparatus that can be used for the present invention. It is also noted that the peeling or scalping head structure of my aforementioned copending application is provided with radially adjustable knives While I have illustrated in FIGURES 1 to 3 how the method in accordance with the present invention may be realized, it is understood that any known apparatus of the prior art may be used for that purpose, and I therefore do not wish to be limited to the details shown and described herein, but intend to cover all such changes and modifications as are encompassed by the scope of the appended claim.

What I claim as my invention and desire to secure by Letters Patent is:

A method for the peeling of elongated work pieces liable to buckling, comprising the successive steps of peeling the work piece starting from a point intermediate its ends firstly in one direction and then in the opposite direction, the thickness of the chip removed increasing at the beginning of said first peeling operation.

No references cited.